United States Patent
Abendschön et al.

(10) Patent No.: US 10,676,652 B2
(45) Date of Patent: Jun. 9, 2020

(54) METHOD AND DEVICE FOR PRODUCING A CONVERSION PRODUCT, IN PARTICULAR STARCH PASTE

(71) Applicant: AHK SERVICE & SOLUTIONS GMBH, Schwaigern (DE)

(72) Inventors: Günter Abendschön, Schwaigern (DE); Bernhard Noll, Michelbach an der Bilz (DE)

(73) Assignee: AHK SERVICE & SOLUTIONS GMBH, Schwaigern (DE)

(*) Notice: Subject to any disclaimer, the term of this patent is extended or adjusted under 35 U.S.C. 154(b) by 94 days.

(21) Appl. No.: 15/757,381

(22) PCT Filed: Aug. 12, 2016

(86) PCT No.: PCT/EP2016/069250
§ 371 (c)(1),
(2) Date: Mar. 5, 2018

(87) PCT Pub. No.: WO2017/036772
PCT Pub. Date: Mar. 9, 2017

(65) Prior Publication Data
US 2018/0244961 A1 Aug. 30, 2018

(30) Foreign Application Priority Data
Sep. 3, 2015 (EP) .................... 15183724

(51) Int. Cl.
*C09J 103/02* (2006.01)
*C08B 30/12* (2006.01)
(Continued)

(52) U.S. Cl.
CPC ........... *C09J 103/02* (2013.01); *A23L 29/219* (2016.08); *A23L 29/284* (2016.08);
(Continued)

(58) Field of Classification Search
None
See application file for complete search history.

(56) References Cited

U.S. PATENT DOCUMENTS 2,805,966 A * 9/1957 Etheridge ............... C08B 30/16
127/32
5,131,953 A * 7/1992 Kasica .................... C08B 30/14
127/28

(Continued)

FOREIGN PATENT DOCUMENTS

CA 629435 A * 10/1961
CA 629435 A 10/1961
(Continued)

*Primary Examiner* — Stefanie J Cohen
(74) *Attorney, Agent, or Firm* — Bachman & LaPointe, PC

(57) ABSTRACT

A method for continuously producing a conversion product, in particular starch glue, fried starch, dissolved gelatin or protein glue, wherein a starch-containing and/or protein-containing, preferably powdery starting material, in particular flour, starch powder, cereal grains, coarse cereal meal, gelatin powder or gluten powder, is fed to a mixing chamber (2) and the starting material, preferably powder, descending in the mixing chamber (2) is subjected to a liquid heated to a processing temperature ($T_U$) of at least 50° C. for converting the starting material into the conversion product, in particular to at least a gelatinization temperature of the starch-containing starting material, a protein-dissolving and/or denaturing temperature of the protein-containing starting material or a frying temperature, in the form of a pressure jet (7) and is thereby conveyed against a baffle (10) preferably formed by an inner wall of the mixing chamber or by an installation in the mixing chamber.

19 Claims, 1 Drawing Sheet

(51) Int. Cl.
*C09J 189/06* (2006.01)
*B01F 5/20* (2006.01)
*A23L 29/219* (2016.01)
*A23L 29/281* (2016.01)
*B01F 3/12* (2006.01)
*B01F 3/20* (2006.01)
*B01F 15/06* (2006.01)
*C08H 1/06* (2006.01)

(52) U.S. Cl.
CPC .......... *B01F 3/1214* (2013.01); *B01F 3/2078* (2013.01); *B01F 5/205* (2013.01); *B01F 15/065* (2013.01); *C08B 30/12* (2013.01); *C08H 1/06* (2013.01); *C09J 189/06* (2013.01); *A23V 2002/00* (2013.01); *B01F 2015/062* (2013.01)

(56) References Cited

U.S. PATENT DOCUMENTS 5,335,588 A * 8/1994 Mahlich .............. A47J 31/4489
261/121.1
7,930,911 B1 4/2011 Rothrock, Jr.

FOREIGN PATENT DOCUMENTS

| EP | 0041669 A1 | 12/1981 |
| EP | 0333674 A2 | 9/1989 |
| EP | 0575762 A1 | 12/1993 |

* cited by examiner

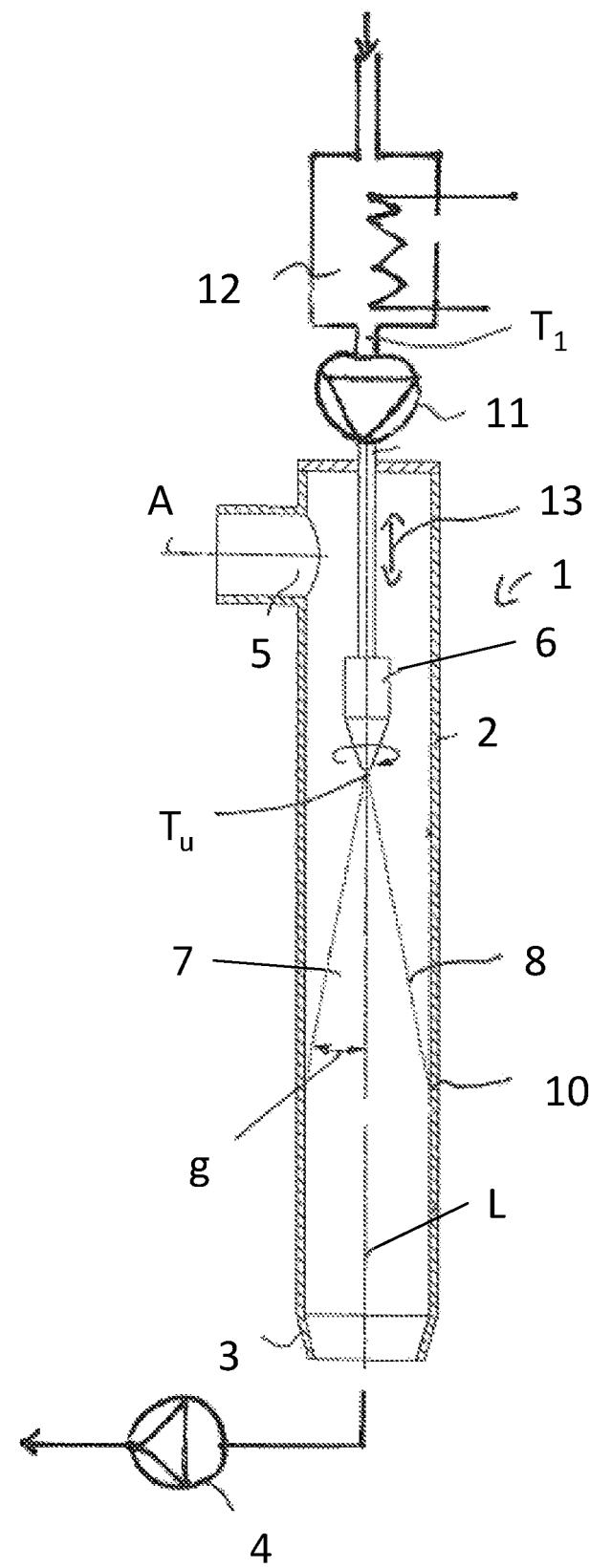

METHOD AND DEVICE FOR PRODUCING A CONVERSION PRODUCT, IN PARTICULAR STARCH PASTE

BACKGROUND OF THE INVENTION

The invention relates to a method for continuously producing, preferably for the food industry, a conversion product preferably having adhesive properties and to a conversion device for carrying out a method of this kind.

In the food industry, the chemical industry, the paper-processing industry, and the laundry industry, starch-containing suspensions are fed during their processes, the starch gelatinizing through water and increased temperature. For example, potato starch gelatinizes starting at 62.5° C., whereas wheat starch gelatinizes starting at 67.5° C. The stiffening capacity of starch glue varies depending on the type of starch.

In practice, the production of starch glue (gelatinized suspension) is problematic and procedurally complex because upon contact of not yet gelatinized starch with hot water, boundary surfaces are immediately formed that prevent a continued infiltration of water (gel blocking), causing undesired clumping.

As a consequence, the gelatinization process is divided into multiple partial steps in current practice, a first step usually consisting of mixing starch powder with water below the gelatinization temperature (gelling temperature), followed by heating the powder/water mixture in a second step (heating step) by introducing heat, such as by heat transfer at a heat transfer surface or by introducing steam. These processes are carried out batch-wise or continuously.

For instance, a two-step method of this kind for producing starch glue is known from EP 0 333 674 A2, which comprises cold pre-mixing and a heating step by steam injection under pressure. A two-step method is also described in U.S. Pat. No. 7,930,911 B1, wherein the heating takes place in a heat exchanger in this case.

Alternatively, hot water can also be provided first and the starch powder is slowly introduced while stirring vigorously. In this case, continuous operation is not possible.

EP 0 041 669 A1 describes a method for heating a starch suspension under pressure and subsequent relaxation.

SUMMARY OF THE INVENTION

Based on the state of the art mentioned above, the object of the invention is to provide an improved conversion method that allows continuous production of a conversion product, in particular of a highly viscous suspension or paste, in particular of a starch glue or a protein glue, in a single process step in a continuous operation and that ensures that undesired clumping in the conversion product is avoided.

Furthermore, the object of the invention is to provide a device for carrying out a conversion method of this kind.

With regard to the method, the object is attained by the features disclosed herein, i.e. by a method for continuously producing a conversion product, in particular starch glue, fried starch, dissolved gelatin or protein glue, wherein a starch-containing and/or protein-containing, preferably powdery starting material, in particular flour, starch powder, cereal grains, coarse cereal meal, gelatin powder or gluten powder, is fed to a mixing chamber and the starting material descending in the mixing chamber is subjected to a liquid heated to a processing temperature of at least 50° C. for converting the starting material into the conversion product, in particular to at least a gelatinization temperature of the starch-containing starting material, a protein-dissolving and/or denaturing temperature of the protein-containing starting material or a frying temperature, in the form of a pressure jet and is thereby conveyed against a baffle preferably formed by an inner wall of the mixing chamber or by an installation in the mixing chamber.

With regard to the conversion device, the object is also attained by the features disclosed herein.

Advantageous embodiments of the invention are provided in the dependent claims. Any combination of at least two of the features disclosed in the description, in the claims and/or in the FIGURES falls within the scope of the invention.

To avoid redundancy, features disclosed in accordance with the method are to be considered as being disclosed and claimed in accordance with the device. Likewise, features disclosed in accordance with the device are to be considered as being disclosed and claimed in accordance with the method.

The invention is based on the idea of feeding a starting material to be converted, in particular a powder, to a mixing chamber, for example via a conveying screw, in such a manner that the starting material (preferably a pourable or free-flowing dry substance) automatically descends in the mixing chamber, in particular falls down from a mixing chamber entry, in particular by the force of gravity, wherein the starch-containing and/or protein-containing starting material, which preferably consists of starch or proteins, is subjected to a liquid jet exiting a nozzle at high pressure during said descending movement. It is substantial that, before coming into contact with the starting material, the liquid has been heated to a processing temperature that leads to the conversion of the starch-containing or protein-containing starting material into the desired conversion product, in particular a conversion product having adhesive properties. The processing temperature is at least a conversion temperature that is required for the preferably chemical and/or physical conversion of the starting material into the conversion product. According to the invention, said processing temperature of the liquid is at least 50° C. in particular at the nozzle exit. By subjecting the starting material, which is in particular powdery, to the heated, in particular hot pressure jet or liquid jet, the starting material is accelerated against a baffle of the mixing container and an immediate conversion, in particular gelatinization or dissolution of the starting material takes place as a result of the combined interaction of the processing temperature and the mechanical application of force.

The above-mentioned baffle is preferably formed by an inner wall of the mixing chamber, which is cylindrical, for example, but it can additionally or alternatively also be formed by an installation in the mixing chamber. The starting material which, as mentioned, moves downward in the mixing chamber preferably in free fall is wetted by the liquid jet, which is under pressure and thus has a high velocity, with liquid heated at least to conversion temperature, is mixed, and is heated at the same time. No later than after the impact on the baffle, the heating process of the starting material and the conversion process, in particular a gelatinization and/or dissolution process or, as explained later, a frying process is completed within the shortest amount of time, in particular within fractions of a second, allowing the conversion product to be collected in particular at the bottom of the mixing container and to be conveyed to a further process preferably directly by means of a pump.

Undesired clumping, which occurs in the state of the art, can be effectively avoided owing to the high velocity of the pressurized liquid in combination with its temperature and the force of the impact of the starting material resulting from the high velocity of the liquid jet, the starting material preferably having already been partially or completely converted when it hits the baffle.

The method according to the invention and the device according to the invention additionally have the advantage of increased personal safety due to the fully automatic mode of operation: unlike in the state of the art in particular in batch processes, there is no risk of scalding during transfer of the product.

There are different options regarding the selection of the starting material. Preferably, the starting material is a dry starting material, even further preferably a powdery starting material which contains starch and/or proteins in any case and which, particularly preferably, consists of starch or alternatively of proteins. The resulting conversion product depends on the selected starting material and on the selected liquid.

Thus, it is conceivable and preferred, for example, to use starch powder, in particular pure starch powder or flour, in particular cereal flour, as a starting material for producing starch glue and to use water as a liquid, which has preferably been heated to at least a gelatinization temperature of the starting material containing starch or consisting of starch or which meets the starting material at said processing temperature. The water temperature at the nozzle exit (processing temperature) is preferably at least 55° C., particularly preferably between 55° C. and 120° C. Gelatinization temperatures of typical starches are preferably at least between 55° C. and 87° C.

The gelatinization temperature of potato starch is 62.5° C., for example, and the gelatinization temperature of wheat starch is 67.5° C. Overall, it is advantageous for the water to be heated to a temperature of at least or more preferably higher than 100° C., in particular to a temperature from a temperature range of between about 101° C. and 130° C., in particular to 105° C. or 110° C. prior to its exit through a nozzle located in the mixing chamber with the aid of suitable heating means, in particular at a common tap water pressure between about 3 bar and 6 bar, and to then be conveyed through the nozzle at a high pressure of preferably more than 30 bar and then to be applied to or wet the starch or the flour as described above. The gelatinization process is completed within the shortest amount of time owing to the interaction of water, high water temperature and mechanical treatment by impact on the baffle, and clumping is effectively avoided.

With the method according to the invention, it is also possible for proteins used as the starting material, in particular in powder form, to be denatured and dissolved in liquid, wherein here, too, heated water is preferably used as the liquid, the water preferably being heated to a protein-dissolving and/or denaturing temperature of the protein-containing starting material. Thus, in this configuration of the method, a starting material containing proteins or consisting of proteins, in particular a gelatin powder or a gluten powder, can be converted into protein glue and the protein, in particular the gelatin or the gluten, can be dissolved in the heated water, the water being preferably brought in contact with the starting material containing proteins or consisting of proteins in a state heated to a processing temperature of at least 80° C. for this purpose. Gelatin swells in water and dissolves when heated to about 50° C. or more. This gel/sol transition can be excellently accelerated by the method according to the invention and can be implemented continuously without clumping.

Gluten forms a so-called glue protein as a conversion product when subjected to heated water.

For this purpose, too, the water is preferably heated to a temperature of at least 100° C. by suitable heating means prior to its exit from the nozzle.

With the method according to the invention, it is also possible to let cereal grains or coarse cereal meal as the starting material swell in a continuous process within the shortest amount of time and to thus convert them into the conversion product then consisting of swollen cereal grains or coarse meal.

Irrespective of the starting material specifically selected, it has been found advantageous for at least 1.5 parts by weight of water, preferably at least 2 parts by weight of water, preferably at least 2 parts by weight of water, particularly preferably between 1.5 and 5 parts by weight of water to be used based on one part by weight of starting material.

Surprisingly, the method according to the invention can also be adapted as a continuous frying method, wherein oil heated to a frying temperature is used as the liquid in this case. Said heated oil can be obtained by heating cold oil and/or grease prior to conveying it through at least one pressure nozzle in the mixing chamber. For example, if starch or a starch-containing starting material, in particular a powder, is used as the starting material for implementing such a frying method according to the invention, the starting material is converted by the mixing and frying according to the invention and in particular a browned starch mixed with oil is thus obtained as a conversion product. Preferably, the (fried) conversion product is characterized by a dry crust and/or by a toasted aroma (Maillard reaction).

In the case that the frying method is implemented, it is preferred for at least one part by weight of oil, particularly preferably between 2 parts by weight and 3 parts by weight of oil to be used based on one part by weight of starting material.

In an embodiment of the invention, it is advantageously provided for the liquid to be pressurized to a (hydraulic) conveying pressure of at least 10 bar, preferably at least 20 bar, and/or to a pressure from a pressure range of between 10 bar and 500 bar prior to entry into the nozzle so as to ensure a sufficiently high kinetic energy of the heated liquid jet. It is particularly preferred for the liquid exit velocity of the liquid from the nozzle to be set in a range of between 100 km/h and 500 km/h, particularly preferably between 250 km/h and 500 km/h.

There are different options with regard to the exact design of the at least one pressure nozzle through which the liquid heated at least to conversion temperature is conveyed into the mixing chamber. For instance, it is possible and preferred for the pressure nozzle to be a rotation nozzle which rotates at a high speed. The pressure nozzle can have a single nozzle opening or, alternatively, multiple nozzle openings. Irrespective of whether the nozzle is a rotation nozzle or not, different spray patterns can be realized, in general. It is particularly preferred for the pressure nozzle to be configured to generate hollow-cone spray patterns or, alternatively, a flat or saucer-shaped spray pattern.

In order for the liquid to be heated prior to its exit from the pressure nozzle, it is preferred for corresponding heating means to be provided upstream of the pressure nozzle in the flow direction of the liquid. Thermal energy can then be introduced into the liquid through direct feeding of steam or via a transfer surface, in particular in a heat exchanger or in a flow heater. It is particularly preferred if, as explained above, the heating means heat the liquid to a temperature above the processing temperature, in particular overheat it, i.e. to a value above the evaporation temperature, preferably to 100° C., for which purpose a corresponding counter-pressure, in particular a fresh-water line pressure, should be present. It is particularly advantageous if the temperature to which the liquid is heated is controlled, for which purpose a temperature sensor can be assigned to the heating means, by means of which a current temperature of the liquid can be measured, such as, preferably, the temperature of the liquid upstream and/or downstream of the pressure nozzle exit, so as to compare this value to a target value in the course of control and to control the heating means according to this measurement result.

An embodiment of the method and of the device in which the pressure nozzle is adjusted relative to the baffle in particular while the starting material is being subjected to the pressure jet so as to ensure self-cleaning of the mixing container, which is preferably a mixing tube, has proven particularly advantageous. For this purpose, in a particularly preferred manner, the nozzle is moved translatorily, up and down or upward or downward, for example, in particular together with its mounting fixture, by means of a pneumatic cylinder, which causes the conversion product to be cleaned off of the baffle and/or the mixing chamber wall. It is conceivable and preferred for the nozzle to be adjusted at fixed, in particular settable intervals.

In general, it is possible and preferred for the conversion product to be mixed with further ingredients, in particular after it has left the mixing chamber; for instance, gelatin powder can be dissolved in water according to the invention and then be mixed with sugar and, if required, additional water and acid, in particular citric acid, in a kettle arranged downstream of the mixing chamber, for example, such as for producing gumdrops. This saves a lengthy process of swelling, which is currently still common.

In general, however, it is also conceivable for further ingredients, such as sugar, water, and/or acid, to be added while still in the mixing chamber, which, whoever, is preferably forgone.

Hereinafter, possible examples of application of the method according to the invention will be described, which, however, are not intended to limit the subject-matter of the invention, but are to be understood as advantageous embodiments:

a) In the course of the method according to the invention, powdery wheat flour can be used as the starting material, which will then be mixed with heated water until it has pudding-like texture.

It has proven particularly advantageous for one part by weight of wheat flour to be mixed with three parts by weight of water, the water preferably being heated in corresponding heating means to a temperature of more than 100° C., in particular to up to 125° C., i.e. overheated, prior to its exit from the nozzle, the water preferably having a temperature of up to 105° C. (temperature higher than the processing temperature) when exiting the nozzle. The obtained (glue) paste can be added as an ingredient to wheat dough in an additional subsequent process step in order to change and optimize the crumb and crust properties.

b) Alternatively, it is possible for potato starch to be subjected to heated water in the course of the method according to the invention, wherein preferably one part by weight of potato starch is mixed with two parts by weight of water, which leaves the mixing-chamber nozzle at high pressure for this purpose. It has proven particularly advantageous for the water to be heated to 110° C. by means of heating means prior to its exit from the nozzle, the water preferably having a temperature of up to 105° C. when leaving the nozzle. The suspension or the starch glue thus obtained can be added to a mixture of potato flakes, salt and, if applicable, spices so as to produce potato chips.

c) It is also possible for maize flour, as the starting material, to be subjected to a heated calcium hydroxide solution, wherein it is particularly advantageous for one part by weight of maize flour to be subjected to 2.5 parts by weight of 2% calcium hydroxide solution which has been heated to a temperature of, for example, 100° C. prior to its exit from the nozzle. The result may be a starting material for tortilla chip production from masa flour.

d) It is also possible for wheat starch to be mixed with heated water. In particular, one part by weight of wheat starch is mixed with three parts by weight of water, the water preferably being heated to more than 100° C., in particular to 105° C. In a flow mixer, the obtained glue paste can then be thinned with cold water to the concentration required for use in paper finishing.

e) It is also possible for cereal grains to be mixed with heated pressurized water. For example, one part by weight of cereal grains is mixed with three parts by weight of heated water, the water preferably being heated to a temperature of 100° C. before it is fed to the nozzle. After the conversion process, the conversion product can be cooled to ambient temperature in a container; this helps to significantly accelerate the swelling of the grains.

f) It is also possible for wheat gluten in powder form, as the starting material, to be mixed with heated water which exits from a nozzle. It has proven particularly advantageous for one part by weight of wheat gluten to be mixed with four parts by weight of water which has previously been heated to preferably 100° C. The conversion product may be a basic material for vegetarian products that can be used as a substitute for or in addition to textured protein, for example.

g) It is also possible for gelatin powder, as the starting material, to be mixed with water which has preferably been heated to 100° C. before exiting the nozzle. It has proven particularly advantageous for one part by weight of gelatin powder to be mixed with three parts by weight of water, whereby the gelatin is dissolved. Then, the protein glue can be mixed with sugar, water and citric acid in a kettle to produce gumdrops, for example. A lengthy cold-swelling process is avoided in this way.

BRIEF DESCRIPTION OF THE DRAWINGS

Other advantages, features and details of the invention are apparent from the following description of a preferred embodiment of a conversion device according to the invention with reference to FIG. 1, which is the only FIGURE.

DETAILED DESCRIPTION

FIG. 1 shows an embodiment of a conversion device 1 configured according to the concept of the invention for carrying out a conversion method according to the invention. The conversion device 1 comprises a mixing chamber 2 having a vertical longitudinal center axis L. The mixing chamber 2 is substantially cylindrical and comprises a lower discharge opening 3 which tapers downward in the shape of a cone in relation to the mixing chamber located above it. A conveying pump 4 is arranged downstream of the discharge opening 3, the conveying pump 4 serving to automatically convey a conversion product to be explained later from the mixing chamber 2 to a further process.

At the top left of the drawing plane, an input opening 5 can be seen, through which preferably pourable or free-flowing starch-containing and/or protein-containing starting material can be fed along an input axis A which is perpendicular to the longitudinal center axis L. Ideally, a screw conveyor (not illustrated) is employed for this purpose.

Within the mixing chamber 2, a pressure nozzle 6 is arranged, which here is exemplarily configured as a rotation nozzle and by means of which a pressure jet 7 of a fed liquid can be generated. The pressure nozzle 6 is configured in such a manner that it generates a hollow cone-shaped spray pattern 8 in the shown embodiment, a cone angle 9 of the spray pattern 8 corresponding to the inclination of the pressure jet 7 being settable.

The inner circumferential surface of the mixing chamber 2 forms a baffle 10 which is hit by the pressure jet 7 and against which the pressure jet accelerates the starting material 3 falling down from the top.

It can be seen that the nozzle 10 can be supplied with liquid via a high-pressure pump 11, the liquid having previously been heated to a temperature $T_1$ with the aid of exemplarily illustrated heating means 12 and the thus heated liquid leaving the nozzle 6 in the mixing chamber 2 at a slightly lower processing temperature $T_U$. Preferably, the temperature loss on the way to the nozzle, i.e. across the distance between the heating means 12 and the nozzle opening, is less than 6° C. Alternatively, the high-pressure pump 11 can also be arranged upstream of the heating means 12 in the conveying direction.

In one aspect of the invention, for generation of starch glue as conversion product or of dissolved protein-containing starting material, in particular dissolved gelatin or gluten, as conversion product, water or an aqueous solution, in particular a calcium hydroxide solution, is used as liquid and which is heated to a processing temperature ($T_U$) of at least 55° C., preferably at least 60° C., further preferably at least 70° C., even further preferably at least 80° C., particularly preferably at least 90° C., and/or to a processing temperature ($T_U$) from a value range of between 55° C. and 130° C., even further preferably between 71° C. and 100° C.

In accordance with a further aspect of the invention, for the generation of fried starch as a conversion product, oil is used as a liquid and to a processing temperature ($T_U$) of at least 130° C., preferably at least 140° C., further preferably at least 150° C., and/or to a processing temperature (To) from a value range of between 130° C. and 200° C., even further preferably between 140° C. and 190° C.

In accordance with a further aspect of the invention, for the generation of the pressure jet (7), the liquid is conveyed through the pressure nozzle (6) with a conveying pressure of at least 20 bar and/or with a conveying pressure from a value range of between 10 bar and 500 bar, preferably between 30 and 500 bar.

In accordance with a further aspect of the invention, the liquid is heated by a heading means (12) arranged upstream the pressure nozzle (6) in a conveying direction of the liquid, in particular a flow heater, in particular to a temperature ($T_1$) above the processing temperature ($T_U$).

In the specific embodiment, the heating means 12 are flow heaters which are supplied with liquid, such as fresh water under line pressure.

During the conversion process, the nozzle 6 can be translatorily adjusted within the mixing chamber 2 at intervals in the directions of the arrows 13 along the longitudinal center axis L so as to clean the baffle 10 during the process.

If, for example, starch powder or flour is introduced through the input opening 5, it rains down, and a liquid, water in this case, which has been heated to processing temperature, which is at least the gelatinization temperature in this case, meets the starting material at high pressure, such as at least 40 bar, the starting material thus hitting the baffle 10 and immediately gelatinizing because of the heat effect and the mechanical load, after which the starting material can be discharged at the bottom by means of the conveying pump 4.

In an alternative embodiment, oil can be used as the liquid, for example, which is preferably heated to more than 130° C. in order to realize a continuous frying process.

REFERENCE SIGNS 1 conversion device
2 mixing chamber
3 discharge opening
4 conveying pump
5 input opening
6 pressure nozzle
7 pressure jet
8 spray pattern
9 cone angle
10 baffle
11 high-pressure pump
12 heating means
13 arrow direction
A input axis
L longitudinal center axis
$T_1$ heating temperature
$T_U$ processing temperature

The invention claimed is:

1. A method for continuously producing a conversion product, wherein a starch-containing and/or protein-containing starting material, in the form of a powder, is fed to a mixing chamber and the starting material, descending in the mixing chamber, is subjected to a liquid from a pressure jet configured as a liquid jet flowing through a pressure nozzle and thereby conveyed against a baffle, and heated to a processing temperature ($T_U$) of at least 50° C. to convert the starting material to the conversion product, wherein the liquid is conveyed through the pressure nozzle with a conveying pressure of at least 10 bar to generate the pressure jet and has a velocity of at least 100 km/h.

2. The method according to claim 1, wherein starch glue, fried starch, dissolved gelatin or protein glue is produced as the conversion product.

3. The method according to claim 1, wherein the baffle is formed by an inner wall of the mixing chamber or an installation in the mixing chamber.

4. The method according to claim 1, wherein a conversion temperature is at least a gluing temperature of the starch-containing starting material, a protein-dissolving temperature and/or a denaturation temperature of the protein-containing starting material or a frying temperature.

5. The method according to claim 1, wherein starch glue or dissolved gelatin is produced as the conversion product, and water or an aqueous solution is used as the liquid and is heated to a processing temperature ($T_U$) of at least 55° C.

6. The method according to claim 5, wherein the aqueous solution is a calcium hydroxide solution.

7. The method according to claim 5, wherein the processing temperature ($T_U$) is between 55° C. and 130° C.

8. The method according to claim 1, wherein fried starch is produced as the conversion product, and oil is used as the liquid and heated to a processing temperature ($T_U$) of at least 130° C.

9. The method according to claim 3, wherein the processing temperature ($T_U$) is between 130° C. and 200° C.

10. The method according to claim 1, wherein the liquid is conveyed through the pressure nozzle with a conveying pressure of at least 20 bar.

11. The method according to claim 1, wherein the liquid is conveyed through the pressure nozzle with a conveying pressure between 10 bar and 500 bar.

12. The method according to claim 10, wherein the liquid is heated by a heating means arranged upstream the pressure nozzle in a conveying direction of the liquid to a temperature ($T_L$) above the processing temperature ($T_U$).

13. The method according to claim 10, wherein the pressure jet has a velocity of at least 250 km/h.

14. The method according to claim 10, wherein the pressure nozzle is a rotation nozzle and/or is configured to generate a hollow cone-shaped or saucer-shaped spray pattern.

15. The method according to claim 10, wherein the pressure nozzle, during subjection of the starting material with the pressure jet, is adjusted relative to the baffle.

16. The method according to claim 15, wherein the pressure nozzle is adjusted translatory relative to the baffle.

17. The method according to claim 15, wherein the pressure nozzle is adjusted in a vertical up-and-down movement relative to the baffle.

18. The method according to claim 1, wherein the conversion product is conveyed out of the mixing chamber by pumping.

19. The method according to claim 1, wherein the conversion product is mixed, outside the mixing chamber, with further ingredients for producing food.

* * * * *